US010525494B2

(12) United States Patent
Hooper et al.

(10) Patent No.: US 10,525,494 B2
(45) Date of Patent: Jan. 7, 2020

(54) SPRAY TOOL SYSTEM

(71) Applicant: Carlisle Fluid Technologies, Inc., Charlotte, NC (US)

(72) Inventors: Justin Richard Hooper, Chicago, IL (US); Jonathan Jean Guernsey, Temperance, MI (US)

(73) Assignee: Carlisle Fluid Technologies, Inc., Scottsdale, AZ (US)

( * ) Notice: Subject to any disclaimer, the term of this patent is extended or adjusted under 35 U.S.C. 154(b) by 0 days.

(21) Appl. No.: 15/016,671

(22) Filed: Feb. 5, 2016

(65) Prior Publication Data
US 2016/0228901 A1 Aug. 11, 2016

Related U.S. Application Data

(60) Provisional application No. 62/112,564, filed on Feb. 5, 2015.

(51) Int. Cl.
| | | |
|---|---|---|
| *B05B 12/00* | (2018.01) | |
| *B05B 12/14* | (2006.01) | |
| *B05B 7/02* | (2006.01) | |
| *B05B 12/08* | (2006.01) | |
| *G01F 1/00* | (2006.01) | |
| *B05B 7/24* | (2006.01) | |

(52) U.S. Cl.
CPC ............ *B05B 12/008* (2013.01); *B05B 7/02* (2013.01); *B05B 12/004* (2013.01); *B05B 12/085* (2013.01); *B05B 12/1436* (2013.01); *G01F 1/00* (2013.01); *B05B 7/2489* (2013.01); *B05B 12/14* (2013.01); *G05B 2219/45013* (2013.01)

(58) Field of Classification Search
CPC ....... B05B 7/02; B05B 12/008; B05B 12/004; B05B 12/085; B05B 12/1436; B05B 12/02
USPC .......................... 239/71; 700/282, 283, 285
See application file for complete search history.

(56) References Cited

U.S. PATENT DOCUMENTS

| | | |
|---|---|---|
| 4,722,625 A | 2/1988 | O'Brien |
| 5,099,687 A | 3/1992 | Lunzer et al. |
| 5,182,704 A | 1/1993 | Bengtsson |
| | (Continued) | |

FOREIGN PATENT DOCUMENTS

| | | |
|---|---|---|
| CN | 101321684 A | 12/2008 |
| DE | 102006056879 A1 | 6/2008 |
| | (Continued) | |

OTHER PUBLICATIONS

International Search Report for PCT/US2016/016855 dated Apr. 21, 2016; 11 pages.

(Continued)

*Primary Examiner* — Viet Le
(74) *Attorney, Agent, or Firm* — Fletcher Yoder, P.C.

(57) ABSTRACT

A system includes a production process information system configured to be installed within a service shop, an air supply flow meter configured to detect air flow to a first manual sprayer and send the detected air flow to the production process information system, and a coating material flow meter configured to detect fluid flow to the first manual sprayer and send the detected fluid flow to the production process information system. The production process information system is configured to determine sprayer usage parameters based on the air flow and the fluid flow.

22 Claims, 3 Drawing Sheets

(56) References Cited

U.S. PATENT DOCUMENTS

| | | |
|---|---|---|
| 5,636,653 A | 6/1997 | Titus |
| 6,045,056 A * | 4/2000 | Tardoni .................. B05B 7/00 |
| | | 118/300 |
| 6,059,884 A | 5/2000 | Seitz et al. |
| 6,149,071 A | 11/2000 | MacCallumMhor et al. |
| 6,500,262 B1 | 12/2002 | Bednarz et al. |
| 6,543,647 B1 | 4/2003 | Buchholz |
| 6,628,329 B1 | 9/2003 | Chasen |
| 6,896,152 B2 | 5/2005 | Pittman et al. |
| 6,935,575 B2 | 8/2005 | Lacchia et al. |
| 7,024,285 B2 | 4/2006 | Saelens |
| 7,264,160 B2 | 9/2007 | Polarine et al. |
| 7,504,338 B2 | 3/2009 | Du et al. |
| 7,743,055 B2 | 6/2010 | Rodrigues et al. |
| 7,747,615 B2 | 6/2010 | Rodrigues et al. |
| 7,792,611 B2 | 9/2010 | Scheer |
| 7,822,845 B2 | 10/2010 | Polarine et al. |
| 8,037,844 B2 * | 10/2011 | Mather .................. B05B 5/032 |
| | | 118/308 |
| 8,109,685 B1 | 2/2012 | Vito |
| 8,561,921 B1 | 10/2013 | Showman et al. |
| 8,601,977 B2 | 12/2013 | Mauchle et al. |
| 2004/0177975 A1 * | 9/2004 | Laskaris .................. A62C 5/02 |
| | | 169/13 |
| 2005/0011967 A1 | 1/2005 | Skelton-Becker et al. |
| 2007/0017443 A1 | 1/2007 | Skelton-Becker et al. |
| 2010/0161141 A1 | 6/2010 | Herre et al. |
| 2010/0319176 A1 | 12/2010 | Stewart et al. |
| 2012/0009329 A1 | 1/2012 | Mather et al. |
| 2012/0072035 A1 | 3/2012 | Nielsen et al. |
| 2012/0109660 A1 | 5/2012 | Xu et al. |
| 2012/0254141 A1 | 10/2012 | Poland et al. |
| 2012/0321485 A1 | 12/2012 | Proietti De Marchis |
| 2013/0048318 A1 * | 2/2013 | Ewers .................. A62C 5/02 |
| | | 169/46 |
| 2013/0083991 A1 * | 4/2013 | Rodrigues .............. B05D 5/005 |
| | | 382/141 |

FOREIGN PATENT DOCUMENTS

| | | |
|---|---|---|
| JP | H0445565 U | 4/1992 |
| JP | 2001129453 A | 5/2001 |
| JP | 2013111513 A | 6/2013 |

OTHER PUBLICATIONS

Binks, Global Electronic Mix Solutions-Plural Component Mixing System, Operation Manual, 62 pages, Jul. 2015.
Binks, Enhanced Troubleshooting Manual, Global Mix Solutions-Plural Component Mixing System, 46 pages, 2013.
Binks, Global Electronic Mix Solutions, beyond accurate mixing, 4 pages, 2015.
Binks, Global Electronic Mix Solutions, Feeling Pressure to Improve Your Finishing Process?, 2 pages, 2015.
Australian Examination Report for AU Application No. 2016215089 dated Feb. 12, 2018, 3 pgs.
Canadian Office Action for CA Application No. 2,974,835 dated May 9, 2019, 5 pgs.
Japanese Office Action for JP Application No. 2017-541271 dated Jun. 12, 2018, 6 pgs.
Australian Office Action for AU Application No. 2016215089 dated Jun. 5, 2018, 3 pgs.
Canadian Office Action for CA Application No. 2974835 dated Jul. 30, 2018, 4 pgs.
Chinese Office Action for CN Application No. 201680018848.4 dated Dec. 27, 2018, 27 pgs.
Japanese Office Action for JP Application No. 2017-541271 dated Feb. 12, 2019, 7 pgs.

* cited by examiner

SPRAY TOOL SYSTEM

CROSS-REFERENCE TO RELATED APPLICATION

This application is a non-provisional application that claims priority to and benefit of U.S. Provisional Patent Application No. 62/112,564, entitled "Spray Tool System", filed Feb. 5, 2015, which is herein incorporated by reference in its entirety for all purposes.

BACKGROUND

The invention relates generally to manual spray tool systems.

Manual spray tools output sprays to more efficiently coat objects. For example, human operators may use spray tools to paint objects or otherwise coat target objects with a coating material (liquid coating, powder coating, spray foam, sealants, adhesives, plasma or flame treatments). Unfortunately, each human operator may operate the spray tool with different settings, techniques, and skill, resulting in significant variances in performance and efficiency. For example, one user may be operating the spray tool improperly or inefficiently, while another user may be operating the spray tool properly and/or more efficiently.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment a system includes a production process information system configured to be installed within a service shop, an air supply flow meter configured to detect air flow to a first manual sprayer and send the detected air flow to the production process information system, and a coating material flow meter configured to detect fluid flow to the first manual sprayer and send the detected fluid flow to the production process information system. The production process information system is configured to determine sprayer usage parameters based on the air flow and the fluid flow.

In another embodiment a method includes detecting air flow to a manual sprayer, the air flow being detected with an air flow meter. The method also includes detecting fluid flow to the manual sprayer, the fluid flow being detected with a coating material flow meter. The method also includes determining a type of sprayer usage based on the detected air flow and the detected fluid flow.

In another embodiment a system includes a first production process information system having non-transitory computer readable medium storing instructions configured to receive a detected air flow to a manual sprayer, the air flow is detected by an air flow meter, and receive a detected fluid flow to the manual sprayer, the fluid flow is detected with a coating material flow meter, and wherein the air flow and fluid flow are configured to spray a workpiece, and determine a type of sprayer usage based on the detected air flow and the detected fluid flow.

In another embodiment, a system includes a production process information system configured to monitor one or more sensors associated with a spray coating system, the production process information system being configured to analyze data acquired by the one or more sensors and generate one or more reports relating to operation of the spray coating system.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
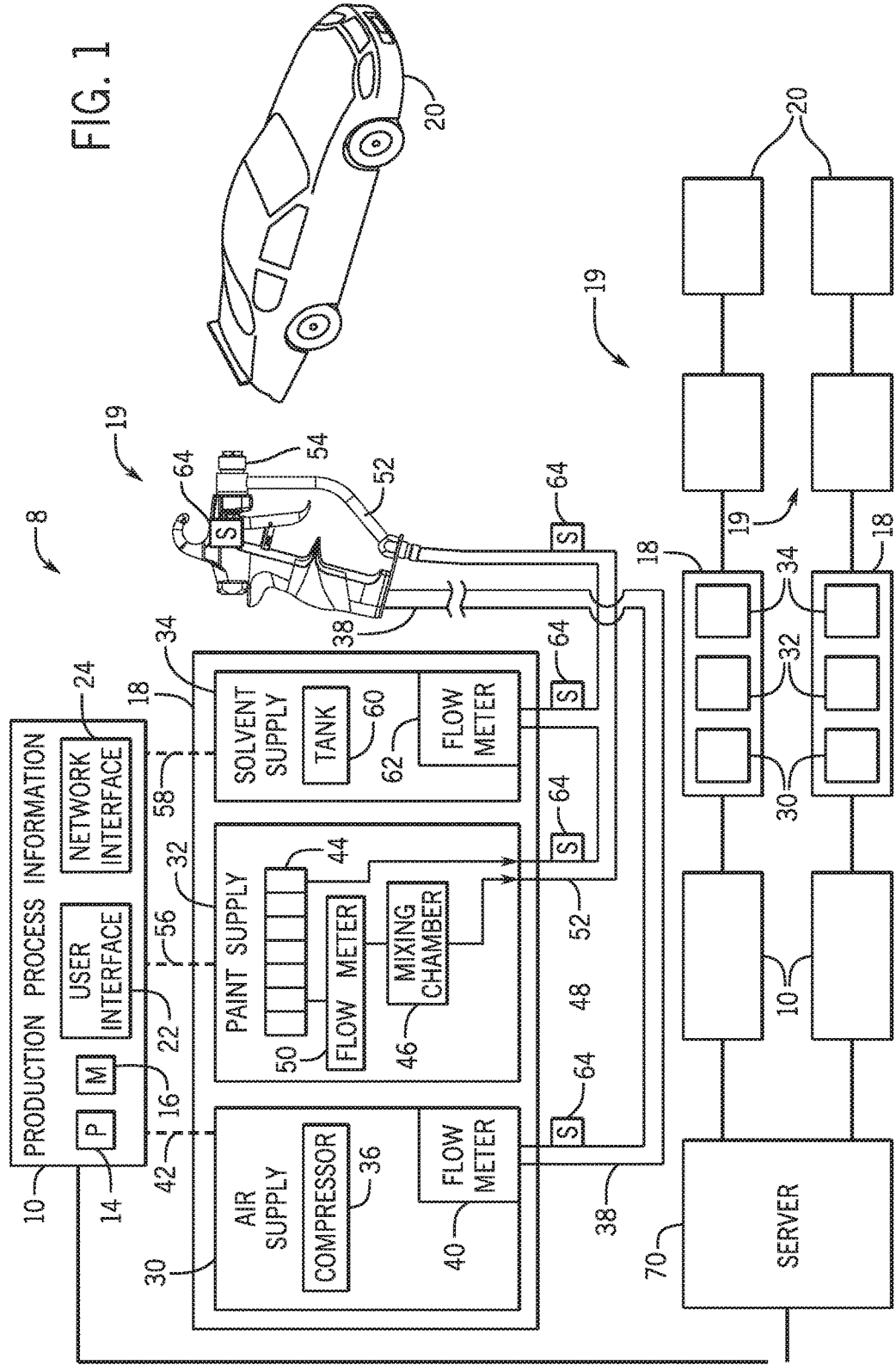
FIG. 1 is a schematic view of an embodiment of a manual spray tool system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is generally directed to a production process information system capable of collecting and processing information about a production process within a service shop, such as a repair shop, a manufacturing shop, a paint shop, an automotive shop, or any combination thereof. More specifically, the production process information system detects material flow (e.g., solid particulate and/or fluid flow, such as gas and/or liquid flow) and determines parameters of the service operation based on timing, amounts of flow, and/or various other sensor data. These parameters may be used to determine efficiency numbers for a given location, operator (e.g., a person operating the spray tool), and/or process over a period of time, e.g., day, week, month, or year. For example, the process information system may monitor various sensor feedback associated with spray tools (e.g., handheld sprayers, spray guns, powder coat guns, electrostatic spray guns, rotary sprayers such as bell cup sprayers, gravity fed sprayers, siphon fed sprayers, etc.), such as sensor feedback relating to flow rate, flow velocity, flow temperature, flow pressure, flow viscosity, material composition (e.g., mixture composition, fluid to air ratio, or powder to air ratio), environment conditions (e.g., temperature, pressure, or humidity), distance between the spray tool and a surface being coated with a spray, position and motion of the spray tool (e.g., speed, acceleration, and/or direction of motion), or any combination thereof. Sensors may be distributed throughout spray tools (e.g., spray guns), conduits, flow control devices (e.g., valves, pressure regulators, etc.), fluid tanks or supplies (e.g., gas tanks and/or liquid tanks), powder tanks or supplies, pumps, compressors, hoppers or solids feeders, fluid mixers, powder mixers, or any combination thereof. The sensor feedback may help to monitor use of the fluids (e.g., gas and liquid), such as air and paint, fluidized solid particulate (e.g., solid particulate disposed in a gas or liquid flow), such as air and powder, use of the spray tools (e.g., settings or operational parameters), use of the upstream components (e.g., pumps, compressors, tanks, mixers, etc.), or any combination thereof. The production process information system may process the sensor feedback, analyze the sensor feedback, and display one or more reports (e.g., costs, efficiency, performance, quality, etc.) associated with the sensor feedback, change operational parameters of the spray tools and associated equipment, or any combination thereof.

FIG. 1 is a schematic view of an embodiment of a spray tool system 8 with a production process information system 10. As will be described in detail below, the production process information system collects information on the operation of the spray tool system 8 for use in training operators, informing managers, and/or controlling the spray tool system 8. The system 10 of FIG. 1 is merely one example for purposes of illustration, and the techniques discussed herein are intended to be used with any type of spray tools, spray materials (e.g., solid, liquid, and/or gas), processes (e.g., coating, surface treatments, etc.), and applications. Therefore, any reference to fluids or paint in the following discussion and in the figures, is intended to cover any type of material, such as liquid, solid particulate (e.g., powder), foam, sealant, adhesive, chemicals, solvents, flames, plasma, or any combination thereof. Furthermore, although the example relates to spraying, the disclosed techniques may be applicable to any manual tools that involve some amount of human interaction impacting performance, efficiency, quality, costs, etc. For example, the manual tools may include hand tools, portable tools, stationary tools, or any combination thereof. By further example, the manual tools may include electric power (e.g., electric motors or drives), hydraulic power or drives, pneumatic power or drives, combustion engines, or any combination thereof. Furthermore, the manual tools may include any number of manual inputs, such as manual triggers, buttons, switches, selectors, user interfaces, or the like. As discussed in detail below, the production process information system 10 may monitor an operator's use of the tool (e.g., trigger pulls), time of use, and any number of parameters that impacts efficiency, costs, performance, and so forth. The system 10 also may output reports on operator efficiency, cost, performance, and usage of work materials (e.g., fluid or powder paints, air, electricity, etc.), make recommendations for areas of improvement, make suggested adjustments to operating parameters, and so forth. Furthermore, it may be appreciated that the system 10 may output reports in any human-readable and/or machine-readable forms. For example, the reports may be outputted as a human-readable paper/hard copy or may be outputted as data files received by a machine (e.g., a computer or any device including a display user interface) and converted to a human-readable format. For example, an electronic display may provide a user interface to output data in textual fields, graphs, charts, or any visual representation of the data collected by the sensors, analyzed, transformed into other results (e.g., costs, efficiency, performance, trends, etc.), or the like.

The production process information system 10 includes a processor 14 and memory 16. The processor 14 may include a single processor or two or more redundant processors, such as triple redundant processors for control of the production process information system 10. The memory 16 may include volatile and/or non-volatile memory. For example, the memory 16 may include one or more hard drives, flash memory, read-only memory, random access memory, or any combination thereof. In one embodiment, the production process information system 10 may include one or more tangible, non-transitory, machine-readable media (e.g., the memory 16) collectively storing one or more sets of instructions and one or more processing devices (e.g., the processor 14) configured to execute the one or more sets of instructions. The controls may include software and/or hardware controls. For example, the controls may include various instructions or code stored on the memory 16 and executable by the processor 14. The instructions may control what data from the spray tool system 8 is tracked, control operation of the one or more delivery systems 18 based on the tracked information, and/or control one or more spray tools 19. The lower portion of FIG. 1 also illustrates that each delivery system 18 may be connected with more than one spray tool/sprayer 19, and that multiple human operators may use multiple spray tools 19 simultaneously to treat/coat the same workpiece 20.

Returning to the production process information system 10, the production process information system 10 may include a user interface 22 that a user may use to interact with the production process information system 10. In certain embodiments, the system 10 may include a user interface 22 integrated with or coupled to the spray tool 19, remote from the spray tool 19, wearable or holdable by the operator of the spray tool 19, or any combination thereof. The user may input instructions, input data (e.g., manually and/or via smart tags such as radio-frequency identification tags), read raw data, read processed data, and/or instruct the production process information system 10 to send data to an external location. To send the data, the production process information system 10 may include a network interface 24 (e.g., wired and/or wireless communications circuit) that may communicate with various components in and/or out of the spray tool system 8 over wired and wireless communication networks. For example, the network interface 24 may enable the production process information system 10 to send and receive internet commands, data streams, and/or notifications of various conditions of the spray tool system 8 (e.g., delivery system 18, spray tool 19).

The user interface 22 may include one or more inputs and/or outputs (e.g., data fields, graphical representations of data, buttons, option fields, drop down menus, selections, etc.) corresponding to one or more input instructions, input data, read raw data, and read processed data, transformed data, and/or results based on transformed data. The data may include, but is not limited to flow rate, temperature, pressure, a ratio or composition of spray materials (e.g., gas, liquid, and/or solid particulate), a paint resin to hardener ratio, a number of times a trigger, button, or switch is activated at the spray tool 19 or elsewhere, a distance between the spray tool 19 and a target object, a speed or acceleration of the spray tool 19, a direction of movement of the spray tool 19, a number of times or frequency of changes in direction of movement of the spray tool 19, a number of times, frequency, or duration of deviation from one or more thresholds (e.g., distance, speed, flow rate, ratio of materials, outside threshold levels), material costs, labor costs, efficiency, performance, and quality of operator performing. For example, the user interface 22 may have a field to output/display the paint resin to hardener ratio, and the field can also allow user(s) to input instructions as to set or adjust the paint resin to hardener ratio to be a certain number. The user interface 22 also may output the data in real-time or substantially real-time (e.g., with a delay of less than 1, 5, 10, 15, 20, 30, 40, 50, or 60 seconds), at a later time based on further analysis, or any combination thereof. Accordingly, the production process information system 10 may monitor various parameters of the spray tool 19 and associated equipment in real-time or substantially real-time, continuously or substantially continuous, with a high sampling rate (e.g., data acquired at intervals of less than or equal to 0.1, 0.5, 1, 2, 3, 4, 5, 6, 7, 8, 9, or 10 seconds), or any combination thereof. The production process information system 10 also may output data (e.g., raw data, processed data, results, efficiency, alarms, recommendations, etc.) to the operator (e.g., a user interface on the spray tool 19 or a portable electronic device), a remote station, a database, or any combination thereof. For example, the operator of the spray tool 19 may receive input (e.g., audio or visual input) regarding their performance, efficiency, cost, usage of the tool 19, usage of raw materials (e.g., gas, liquid, and/or powder), quality, or any combination thereof, in real-time or at a later time, on a project basis, a continual basis, a periodic basis (e.g., daily, weekly, monthly, or yearly), or any combination thereof. By further example, the various data may be analyzed and results may be determined on an operator basis, a team of operators, a facility or plant, a group of facilities or plants, a project basis (e.g., completing an entire paint job of a car, airplane, or other target object), a part or component basis (e.g., completing a paint job for one or more individual parts, e.g., a door, hood, or fender of a car), or any combination thereof. In this manner, the performance, efficiency, costs, material usage, etc. may be evaluated on various levels, ranging from very specific parts, tasks, or individual operators to much bigger projects or teams of operators.

As illustrated, the information received and processed by the production process information system 10 may come from components of the delivery system 18. These components of the delivery system 18 may include an air supply 30, a paint supply 32, and a solvent supply 34. In certain embodiments, the delivery system 18 may include other components and is not limited to this particular configuration. As illustrated, the air supply 30 is an air storage tank that includes a compressor 36 (e.g., motor-driver compressor) that pressurizes air for use by the spray tool 19. The compressor 36 may electronically communicate with the production process information system 10 to adjust the pressure at which the air flows. The compressed air may be delivered along one or more hoses 38 to the spray tool 19 and tracked using a flow meter 40 or other sensor (e.g., flow sensor, pressure sensor, temperature sensor, or any combination thereof). For example, the flow meter 40 may detect the start and stop of air flow as well as the amount of air flow through the flow meter 40. The information from the air supply 30 (e.g., start and stop of air flow, amount of air flow) may be conveyed to the production process information system 10 through a communication connection 42. The connection 42 may be hard-wired (e.g., USB, Ethernet, etc.) and/or wirelessly connected if the delivery system 18 is located remotely from the production process information system 10. Additionally, the flow meter 40 may be coupled to more than one spray tool 19. Based on the amount of air flow, timing, fluid flow, among other things, the detected air flow from the flow meter 40 may indicate sprayer usage for each connected spray tool 19 individually.

The information received from the air supply 30 may be complemented by information received from the paint supply 32. The paint supply 32 also includes a number of components that may each detect and convey one or more data points to the production process information system 10. For example, the paint supply 32 may include a stack 44 that includes a number of different colors of paint or color components (e.g., a plurality of tanks storing fluids, such a paint colors) that may be mixed to create a specific shade of a color. The paint supply 32 may include a mixing chamber 46 to mix the components automatically (e.g., a motor-driven or passive paint mixer with one or more moveable elements in a chamber), but the paint supply 32 may also accept paint that has been pre-mixed to a specific color. Furthermore, the paint supply 32 may include, within the stack 44, a hardener that is mixed with the paint or paint resin just before it is delivered to the workpiece 20, or other coating materials such as stain, lacquer, varnish, polyurethane, urethane, epoxy, etc. The paint supply 32 also includes a coating material flow meter 50 (or other sensor, such as flow sensor, pressure sensor, temperature sensor, material composition sensor, color sensor, and/or viscosity sensor) to detect the timing and amount of coating material that flows to a coating material hose 52. In embodiments where multiple components form the coating material, the coating material flow meter 50 may sense the timing and amount of each component individually, or the mixed coating material after the mixing chamber 46 has mixed the components (e.g., the coating material flow meter 50 may sense a paint color, a hardener, a resin, or mixture of both). The coating material then flows through the coating material hose 52 to a spray tool 19 where it may be atomized with air from the air supply 30 and applied to the workpiece 20.

The paint supply 32 may convey data to the production process information system 10 from any component (e.g., stack 44, mixing chamber 46, and/or coating material flow meter 50) along a communication connection 56, which may be either wired or wireless. For example, the production process information system 10 may receive flow information from the coating material flow meter 50, such as a total amount of coating material flowing from the paint supply 32, a timing of start and end of the flow, as well as the current flow at any given time.

The production process information system 10 may also receive information from the solvent supply 34 along a communication connection 58. The solvent supply 34 includes a tank 60 (e.g., motor-driven pump, pressurized tank, solvent vessel, etc.) and a solvent flow meter 62 (or other sensor, such as flow sensor, temperature sensor, pressure sensor, etc.). The solvent supply 34 may supply solvent or other treating material to clean the spray tool 19, the hoses 38, 52, or workpiece 20. In particular, the solvent supply 34 may be used when switching from one paint color to another. The solvent supply 34 flushes out the coating material hose 52 so that a previous color of paint does not mix with the current color of paint. As may be appreciated, color mixing between a previous and current paint color may cause color shift when applied to the workpiece 20. In some embodiments, the solvent may be included in the stack 44 of the paint supply 32. The production process information system 10 may also receive information from sensors 64 that may detect conditions at various locations throughout the spray tool system 8. For example, the air supply hose 38 and the coating material supply hose 52 may include sensors 64 that detect environmental conditions (e.g., temperature, humidity, or barometric pressure), flow rate, flow volume, air/fluid temperature, air/fluid pressure, viscosity, material composition, etc. Accordingly, the sensors 64 may provide redundant and/or additional data collection to the flow meters 40, 50, 62 within the delivery system 18. It may also be appreciated that data collected by sensors 64 may be used in combination with data collected by the flow meters 40, 50, and 62 to determine additional information. For example, a ratio of the paint resin to the hardener may be calculated by comparing motion of a hardener pump to the flow rate of paint resin through its respective flow meter.

FIG. 1 also illustrates that the spray tool system 8 includes multiple production process information systems 10 may be connected to a server 70. In turn, the additional production process information systems 10 receive data from respective delivery systems 18 and/or spray tools 19. Each delivery system 18 is illustrated having an air supply 30, a paint supply 32 and a solvent supply 34, though, as explained above, each delivery system 18 may have more or fewer subsystems than the embodiments that are illustrated. Furthermore, while FIG. 1 provides an example of the spray tool system 8 for liquid coating, the illustrated spray tool system 8 may also be applicable for spraying materials in other forms such as materials in solid (e.g., powder), gaseous (e.g., flame) and plasma forms.

Figure 2:
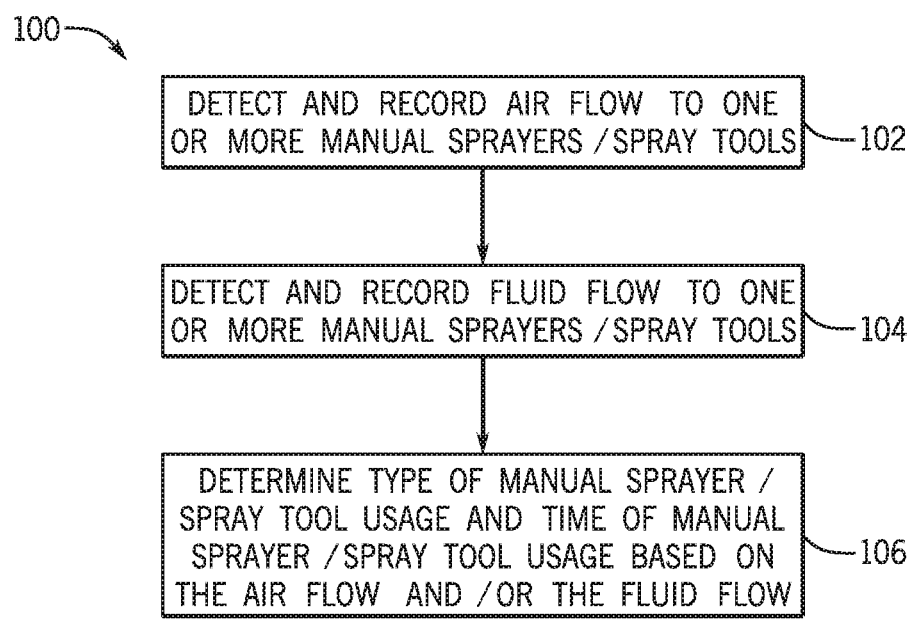
FIG. 2 is a flowchart of an embodiment of a process that the production process information system may use to collect operating data about one or more spray tool systems.

FIG. 2 is a flowchart of an embodiment of a process 100 that the production process information system 10 may use to collect operating data about one or more spray tool systems 8. The process includes a first step of detecting and recording air flow to one or more spray tools 19 coupled to the delivery system 18 (block 102). As explained above, the production process information system 10 may receive air flow information from the flow meter 40 and/or sensors 64. More specifically, the flow meter 40 detects data concerning timing and amount of flow, which is then recorded by the production process information system 10. The process 100 also includes detecting and recording fluid flow to one or more spray tools 19 (block 104). Flow meters such as the coating material flow meter 50, the solvent flow meter 62, and/or the sensors 64 illustrated in FIG. 1 may be used to detect 104 the fluid flow which is then recorded within the production process information system 10. The fluid flow may include coating material fluid flow, solvent fluid flow, or any combination thereof.

The production process information system 10 may then use this information to determine the type of sprayer usage and the time of sprayer usage based on the air flow and/or the fluid flow (block 106). The type of sprayer usage may include data such as total usage of one color of paint, the number of alarms, total usage of solvent, total gun air flow time, total gun spray time, paint resin to hardener ratio, and/or a number of gun triggers. This data may be combined to determine even more comprehensive types of sprayer usage. For example, sprayer usage may include using the air flow to dust off the workpiece 20, continuous spraying of the coating material, and/or intermittent spraying of the coating material, among other things. The types of sprayer usage may indicate that a particular operator is using less effective coating techniques. For example, for a large workpiece 20 requiring several passes of the spray tool 19, the best technique may be to sweep one direction with continuous spray, stop spraying at the end of the sweep, change direction, then start spraying again in the other direction. Continuous spraying in this instance can waste coating material. The production process information system 10 is able to determine the difference between these two spray usages.

Figure 3:
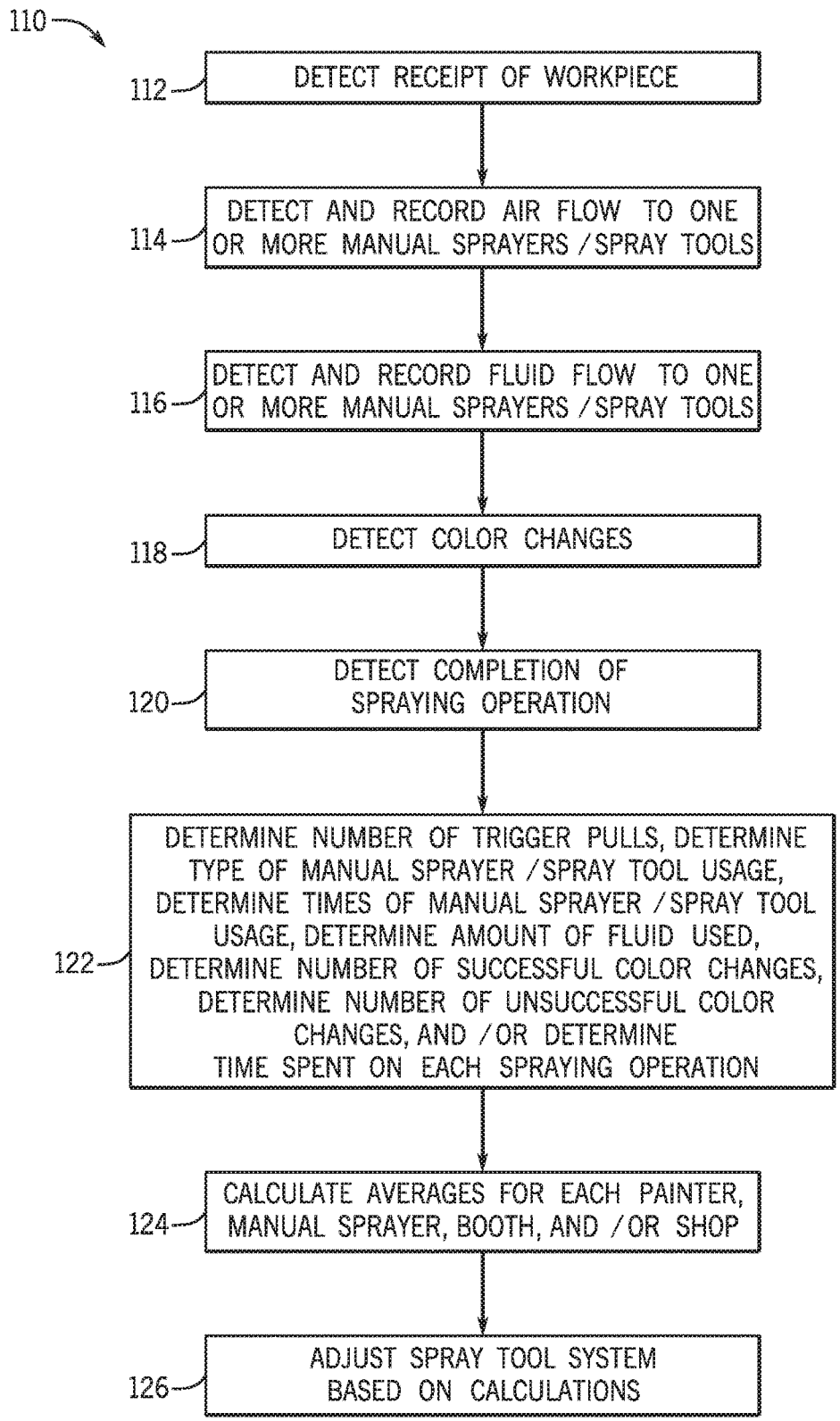
FIG. 3 is a flowchart of an embodiment of a process that the production process information system may use to collect operating data about a spray tool system.

FIG. 3 is a flowchart of an embodiment of a process 110 that the production process information system 10 may use to collect operating data about the spray tool system 8. The process 110 may begin when the production process information system 10 detects 112 receipt of the workpiece 20 into the spray tool system 8. Receipt of the workpiece 20 may include an operator inputting a customer's information into the user interface of the production process information system 10, scanning the workpiece 20 (e.g., scanning an informational tag on the workpiece 20), triggering one of the sensors 64, or any combination thereof. Receipt of the workpiece 20 may also include associating information about the location and operator performing the servicing. For example, receipt of the workpiece 20 may include the name of the operator, the particular manual sprayer being used, the booth in which the sprayer is being used, the shop where the sprayer and/or the booth are located, or any combination of these. This may initiate tracking of several variables of the delivery system 18 as outlined above with respect to FIG. 2. For example, receipt of the workpiece 20 may indicate to the production process information system 10 to detect and record air flow (block 114) or fluid flow (block 116) to one or more manual sprayers. This may be detected as detailed above.

The process 110 also includes detecting color changes (block 118). The detection may be based on just the information detected with the flow meters 40, 50, 62, or may include information detected by the sensors 64 or input by an operator. In certain embodiments, the production process information system 10 correlates information from the flow meters 40, 50, 62 to identify and adjust parameters and suggest changes to user tendencies to minimize waste due to color change errors. As detailed above, a number of parameters of the spraying operation may be compiled based on the relationships between the detected data points. For example, for each spraying operation and/or operator, the production process information system 10 may determine 122 the number of trigger pulls, an average flow rate of a spray gun, type of sprayer usage, time of sprayer usage, amount of fluid used, the number of successful color changes, unsuccessful color changes, a number of parts painted, time spent on color change, and time spent on each spraying operation. In particular, the system 10 may monitor and collect data relating to operator-specific parameters for a particular task (e.g., spraying a specific part or set of parts), and calculate material costs, labor costs, efficiency, performance, and quality for each operator performing that particular task. The system 10 may then compare data among various operators, compare the data versus a baseline or ideal conditions, and determine if the particular operator needs further training, changes in their procedures, changes in operating parameters, and so forth.

The determined data may be collected for a number of spraying operations over a period of time (e.g., days, weeks, months, years) to calculate averages for each booth, painter, sprayer, or for the whole spray tool system 8 (block 124). For example, the production process information system 10 may determine a color usage (liters per month or year), a color usage per work shift, a color cost per month or year, a solvent usage (liters per month or year), a solvent usage per work shift, solvent cost per month or year, color cost per workpiece 20, average labor cost painting per part, total labor cost for painting per month or year, total labor cost for color change per month or year, total labor cost per month or year, total waste cost per month or year, total cost per painter per workpiece, total cost per painter per month or year, percent of labor being allocated to painting, percent of labor being allocated to color change, total revenue generated per month or year, total revenue less cost per month or year for painting, or any combination thereof. From the calculated averages, certain changes may be made to the operation. The calculated averages may be collected and output as a report which a shop manager may consider for an individual spray tool 19, operator (human), spray booth, or spray shop. For example, the generated report may indicate that a particular operator or sprayer is using more fluid than average, leading the manager to inspect the spray tool 19 or train the operator.

Based on the calculated averages, the production process information system 10 adjusts the delivery system 18 to prevent, correct, or fix settings that may take longer and/or cost more for a particular workpiece 20 (block 126). For example, the production process information system 10 may adjust air pressure, fluid flow, solvent pressure, trigger sensitivity, or any combination thereof depending on information received or detected within the spray tool system 8. That is, for one operator using a specific spray tool 19, to spray a particular workpiece 20, the production process information system 10 may have one set of adjustments while a different operator, spray tool 19, or workpiece 20 may have a different set of adjustments. Furthermore, the calculated averages and operating parameters may indicate that an operator or group of operators may benefit from one type of training or may be more suited for doing one type of service. Furthermore, the production process information system 10 outlined above should not be limited to collecting operating data about a spray tool system for liquid coating, but rather the production process information system 10 is also applicable for powder coating, spray foam, sealants, adhesive, plasma, or flame treatment, as well as any type of manual tool.

Again, as discussed above, some or all of the processes 100 and 110 may take place in real-time (e.g., in-situ) during the operation of the spray tool system 8, such that the information/data may be collected in real-time, in certain time intervals, and/or over a period of time, e.g., day, week, month, or year. For example, the information/data sampling may be done in-situ and at high frequency in a time interval of less than or equal to approximately 0.2, 0.25, 0.5, 1, 2, 3, 4, 5, 6, 7, 8, 9, or 10 seconds, such that the operation of the spray tool system 8 may be monitored continuously or substantially continuously. For example, the monitored information/data may be analyzed in-situ or analyzed ex-situ on per time (e.g., hours, days, weeks, etc.) basis, per workpiece basis, per part basis, per project basis, per work shift basis, per spray device basis, per operator basis, per service shop basis, or any combination thereof.

Accordingly, some or all of the parameters/data detailed above may be monitored/tracked continuously, in real-time, and/or in certain sampling time intervals (e.g., less than or equal to approximately 0.2, 0.25, 0.5, 1, 2, 3, 4, 5, 6, 7, 8, 9, or 10 seconds). For example, the parameters/data that are monitored may include trigger information (e.g., number, frequency, and/or duration of actuations of triggers, buttons, switches, valves, or other manual control features of the spray tool 19; trigger position such as on, off or idle), paint/color usage information on a per color/solvent basis, each valve position (e.g., on/off), flow velocity (e.g., gas, liquid, and/or solids), volume, temperature and pressure, fluid level (e.g., in supply tank/container), material composition (e.g., mixture composition, fluid to air ratio, or powder to air ratio), movement of spray gun, distance between the spray tool 19 and a surface being coated with a spray, voltage level of an electrostatic spray gun, speed of a rotary sprayer (e.g., a bell cup sprayer), or any combination thereof.

In summary, the monitored data helps to track real-time usage of the spray tool 19, or any other manually controlled equipment, thereby helping to provide data, reports, recommendations, and control actions to help decrease costs, increase performance, increase efficiency, and increase quality of various processes (e.g., spray coating) and facilities. The data may include any details regarding usage or operation of the spray tool 19, and thus any number of results may be provided to improve the manual labor.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
an air supply flow meter configured to detect an air flow from a delivery system to a first manual sprayer;
a coating material flow meter configured to detect a fluid flow of a coating material from the delivery system to the first manual sprayer, wherein the first manual sprayer is configured to coat a workpiece with the coating material during a spraying operation; and
a first production process information system configured to:
determine operating data of the spraying operation based on the detected air flow and the detected fluid flow, wherein the operating data comprises first manual sprayer data comprising detected trigger pulls of the first manual sprayer, a total spray time of the first manual sprayer, an amount of fluid used by the first manual sprayer, or any combination thereof; and
generate a report relating to the spraying operation, wherein the report comprises the first manual sprayer data and calculated average values of the operating data.

2. The system of claim 1, comprising sensors configured to detect the air flow or the fluid flow electronically.

3. The system of claim 1, comprising a server, wherein the first production process information system comprises a network interface configured to send the operating data of the spraying operation to the server, an internet location, or any combination thereof.

4. The system of claim 3, comprising a second production process information system coupled to the server and configured to determine second manual sprayer data for a second manual sprayer, wherein the report comprises the second manual sprayer data.

5. The system of claim 1, wherein the air supply flow meter is configured to detect the air flow to the first manual sprayer, the system comprises a second air supply flow meter configured detect a second air flow to a second manual sprayer, and the first production process information system is configured to determine the first manual sprayer data and second manual sprayer data for the second manual sprayer individually.

6. The system of claim 1, comprising a compressor configured to dynamically pressurize the detected air flow based on a signal from the first production process information system.

7. The system of claim 1, comprising a solvent flow meter configured to detect a solvent flow to the first manual sprayer and send data relating to the detected solvent flow to the first production process information system.

8. The system of claim 7, comprising a paint supply comprising the solvent flow meter and the coating material flow meter.

9. A method, comprising:
detecting an air flow to a manual sprayer, wherein the air flow is detected with an air supply flow meter;
detecting a fluid flow to the manual sprayer, wherein the fluid flow is detected with a coating material flow meter;
determining, via a production process information system, operating data for a spraying operation based on the detected air flow and the detected fluid flow, wherein the operating data comprises manual sprayer data comprising detected trigger pulls of the manual sprayer, a total spray time of the manual sprayer, an amount of fluid used by the manual sprayer, or any combination thereof; and
generating a report for the spraying operation, wherein the report includes the manual sprayer data and calculated average values of the operating data.

10. The method of claim 9, comprising detecting a solvent flow, and determining a potential color change of a fluid in the fluid flow based on operating data for the manual sprayer relating to the detected air flow, the detected fluid flow, the detected solvent flow, or any combination thereof.

11. The method of claim 10, comprising:
determining a number of successful color changes based on the operating data relating to the detected air flow, the detected fluid flow, the detected solvent flow, or any combination thereof and based on feedback from a color sensor;
determining a number of unsuccessful color changes based on the operating data relating to the detected air flow, the detected fluid flow, the detected solvent flow, or any combination thereof and based on feedback from the color sensor; and
calculating an average color change time for multiple color changes.

12. The method of claim 9, comprising detecting receipt of a workpiece, wherein receipt of the workpiece comprises an input by an operator into the production process information system within a service shop, scanning the workpiece, triggering a sensor within the service shop, or any combination thereof.

13. The method of claim 12, wherein receipt of the workpiece comprises receiving information about the operator, the manual sprayer, a booth in which the manual sprayer is being used, the service shop where the manual sprayer and/or the booth are located, or any combination of these.

14. A system, comprising:
a production process information system comprising non-transitory computer readable medium storing instructions configured to:
receive a detected air flow supplied to a manual sprayer, wherein the detected air flow is detected with an air supply flow meter;
receive a detected fluid flow supplied to the manual sprayer, wherein the detected fluid flow is detected with a coating material flow meter, and wherein the detected air flow and the detected fluid flow are configured to spray a workpiece; and
determine operating data for a spraying operation based on the detected air flow and the detected fluid flow, wherein the operating data comprises manual sprayer data comprising detected trigger pulls of the manual sprayer, a total spray time of the manual sprayer, an amount of fluid used by the manual sprayer, or any combination thereof; and
generate a report for the spraying operation, wherein the report includes the manual sprayer data and calculated average values of the operating data.

15. The system of claim 14, wherein the instructions are configured to adjust the detected air flow, adjust the detected fluid flow, or any combination thereof, based on the manual sprayer data or the calculated average values of the operating data.

16. The system of claim 14, wherein the instructions are configured to receive a second detected air flow supplied to a second manual sprayer, wherein the second detected air flow is detected by a second air supply flow meter.

17. A system, comprising:
a production process information system configured to:
monitor a spraying operation with one or more sensors associated with a spray coating system:
analyze operating data, acquired by the one or more sensors, of the spraying operation, wherein the operating data comprises manual sprayer data comprising detected trigger pulls of a manual sprayer of the spray coating system, a total spray time of the manual sprayer, an amount of fluid used by the manual sprayer, or any combination thereof;
calculate average values of the manual sprayer data for the spray coating system; and
generate one or more reports relating to the spraying operation, wherein the one or more reports comprises the manual sprayer data and the average values of the manual sprayer data.

18. The system of claim 17, wherein the one or more sensors are configured to monitor flow rate, temperature, pressure, viscosity, material composition, or any combination thereof.

19. The system of claim 17, wherein the one or more reports include an efficiency report relating to efficiency of one or more operators using the manual sprayer of the spray coating system, a timing report relating to the total spray time of the manual sprayer by one or more operators for the spraying operation, or any combination thereof.

20. The system of claim 17, comprising the spray coating system having the manual sprayer.

21. The system of claim 17, wherein the production process information system is configured to monitor one or more additional sensors associated with one or more components of the spray coating system, and the one or more components comprise the manual sprayer, a compressor, a tank, a pump, a mixer, a valve, a conduit, or any combination thereof.

22. The system of claim 17, wherein the production process information system is configured to adjust an air flow of the spray coating system, adjust a fluid flow of the spray coating system, or any combination thereof, based on the manual sprayer data or the average values of the manual sprayer data.

* * * * *